United States Patent
Taneichi

(10) Patent No.: US 12,441,033 B2
(45) Date of Patent: Oct. 14, 2025

(54) MOLDING DIE AND SHAPING METHOD

(71) Applicant: MITSUBISHI HEAVY INDUSTRIES, LTD., Tokyo (JP)

(72) Inventor: Jumpei Taneichi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 132 days.

(21) Appl. No.: 18/397,207

(22) Filed: Dec. 27, 2023

(65) Prior Publication Data

US 2024/0208162 A1 Jun. 27, 2024

(30) Foreign Application Priority Data

Dec. 27, 2022 (JP) ................................ 2022-209957

(51) Int. Cl.
| | |
|---|---|
| B29C 33/42 | (2006.01) |
| B29C 53/04 | (2006.01) |
| B29C 53/06 | (2006.01) |
| B29C 53/60 | (2006.01) |
| B29C 70/30 | (2006.01) |

(52) U.S. Cl.
CPC .............. *B29C 33/42* (2013.01); *B29C 53/04* (2013.01); *B29C 53/06* (2013.01); *B29C 70/30* (2013.01)

(58) Field of Classification Search
CPC ......... B29C 33/42; B29C 53/04; B29C 53/06; B29C 70/30
See application file for complete search history.

(56) References Cited

U.S. PATENT DOCUMENTS 8,795,567 B2 8/2014 Bland
2017/0297317 A1* 10/2017 Chapman ................ B29C 33/00

FOREIGN PATENT DOCUMENTS

JP 4773713 B2 9/2011

* cited by examiner

*Primary Examiner* — Jerzi H Moreno Hernandez
(74) *Attorney, Agent, or Firm* — Osha Bergman Watanabe & Burton LLP

(57) ABSTRACT

A kink surface and a placement surface are provided. The kink surface is bent so as to protrude in a depth direction, with a kink line extending along a height direction connecting a top end point and a bottom end point as a boundary. The placement surface has a normal direction substantially coinciding with the height direction and has a bending line extending in a width direction. The top end point is positioned between a first intersection and a second intersection and a bottom end point in the height direction. The bending lines and between the first intersection and the second intersection convexly protrudes toward the kink line in the depth direction.

5 Claims, 13 Drawing Sheets

MOLDING DIE AND SHAPING METHOD

CROSS-REFERENCE TO RELATED APPLICATIONS

This application claims the benefit of priority to Japanese Patent Application Number 2022-209957 filed on Dec. 27, 2022. The entire contents of the above-identified application are hereby incorporated by reference.

TECHNICAL FIELD

The disclosure relates to a molding die and a shaping method.

RELATED ART

A composite material such as carbon fiber reinforced plastic (CFRP) is used in some aircraft components, such as a fuselage and a main wing.

A CFRP structural member (composite material structure) constituting an aircraft component can have any type of cross-sectional shape. One method for manufacturing such a composite material structure is a method in which a plurality of fiber sheets (e.g., pre-preg sheets) are stacked to produce a laminate of flat fiber sheets (also referred to as a "charge"), and this laminate is shaped using a molding die into any suitable shape.

One such shape is a kink shape. A kink shape is a shape including a first surface having a bent shape (kink) and a second surface intersecting the first surface.

The molding die used for shaping the laminate into the kink shape has a kink surface having a bent shape and a placement surface intersecting the kink surface.

When the laminate is shaped using the molding die, if the laminate laid on the kink surface of the molding die is bent toward the placement surface of the molding die, the laminate is compressed on the placement surface, which may cause strain that wrinkles the laminate. Such wrinkles are undesirable because they significantly decrease the strength of the components.

As a molding die for shaping a laminate into a substantially similar shape, for example, there is a molding die disclosed in U.S. Pat. No. 8,795,567.

Although not a molding die for shaping a kink shape, for example, there is a molding die disclosed in JP 4773713 B.

SUMMARY

In U.S. Pat. No. 8,795,567, a surface of a molding die corresponding to the first surface is provided in advance with a protrusion, and a laminate laid on a surface of a molding die corresponding to the second surface is bent toward the surface of the molding die corresponding to the first surface.

However, depending on the ratio between the length dimension of the first surface and the length dimension of the second surface, a shaping method using this molding die is theoretically possible but may not be realistic. For example, in a case where the dimension of the first surface is sufficiently larger than the dimension of the second surface, when an attempt is made to shape the laminate laid on the surface of the molding die corresponding to the second surface, bending the laminate toward the surface of the molding die corresponding to the first surface, deformation caused by the bending extends over a wide range of the entire surface corresponding to the first surface, which increases the risk of wrinkles.

In JP 4773713 B, while wrinkles caused by excess fibers can be prevented, the molding die cannot be given a flat surface required for forming the laminate with a flat interface in contact with other components.

The disclosure has been made in view of such circumstances, and an object of the disclosure is to provide a molding die and a shaping method with which a laminate placed on a placement surface is less likely to wrinkle when shaping the laminate into a kink shape.

In order to solve the above problems, the molding die and the shaping method of the disclosure employ the following means.

That is, a molding die according to an aspect of the disclosure is a molding die for bending a laminate formed by stacking a plurality of fiber sheets, the molding die including: a kink surface on which the laminate is laid; and a placement surface intersecting the kink surface and on which the laminate is placed by bending the laminate laid on the kink surface, in which the kink surface is bent so as to protrude in a second direction orthogonal to a first direction, with a kink line extending along the first direction connecting a first kink point and a second kink point as a boundary, the placement surface has a normal direction substantially coinciding with the first direction and has a bending line extending in a third direction orthogonal to the first direction and the second direction, the kink surface has a first boundary line connecting a first intersection on the bending line and the first kink point, and a second boundary line connecting a second intersection on the bending line and the first kink point, the first intersection is positioned closer to one end of the bending line relative to the first kink point in the third direction, the second intersection is positioned closer to the other end of the bending line relative to the first kink point in the third direction, the first kink point is positioned between the first intersection and the second intersection and the second kink point in the first direction, and the bending line between the first intersection and the second intersection convexly protrudes toward the kink line in the second direction.

A shaping method according to an aspect of the disclosure is a shaping method for shaping the laminate using the molding die described above, the shaping method including laying the laminate on the kink surface, and bending, toward the placement surface along the bending line, the laminate laid on the kink surface.

According to the disclosure, a laminate placed on a placement surface is less likely to wrinkle when shaping the laminate into a kink shape.

BRIEF DESCRIPTION OF DRAWINGS

The disclosure will be described with reference to the accompanying drawings, wherein like numbers reference like elements.

DESCRIPTION OF EMBODIMENTS

Figure 1:
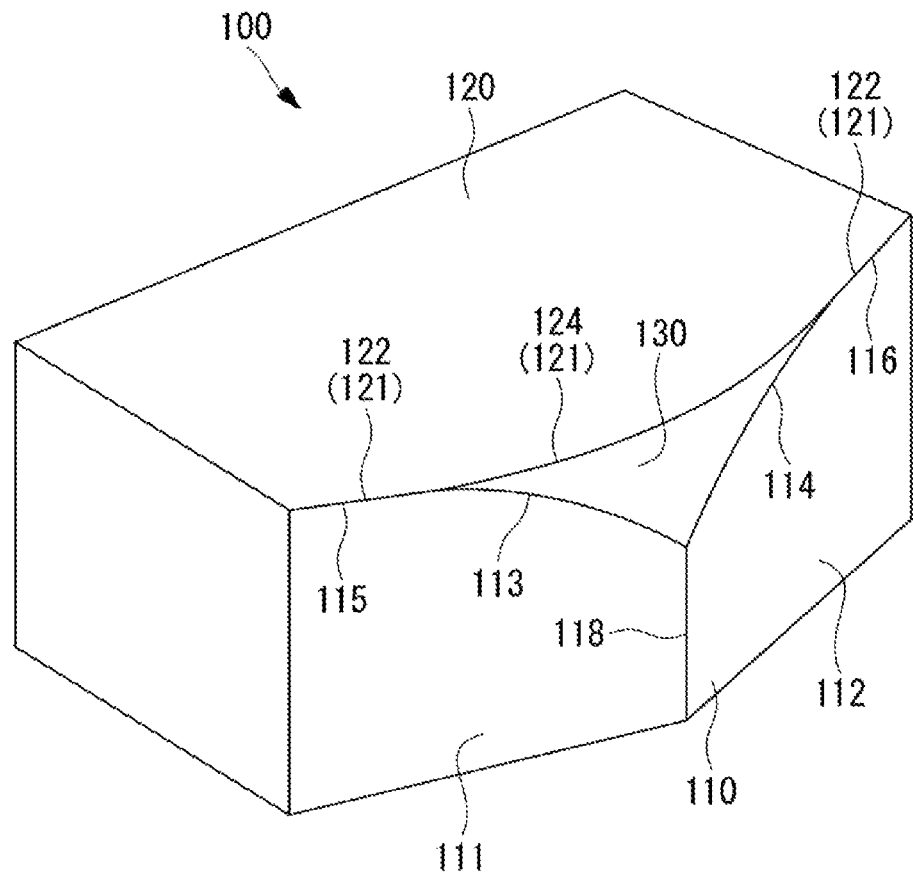
FIG. 1 is a perspective view of a molding die according to an embodiment of the disclosure.
Figure 1:
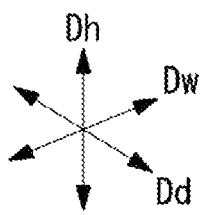
Figure 2:
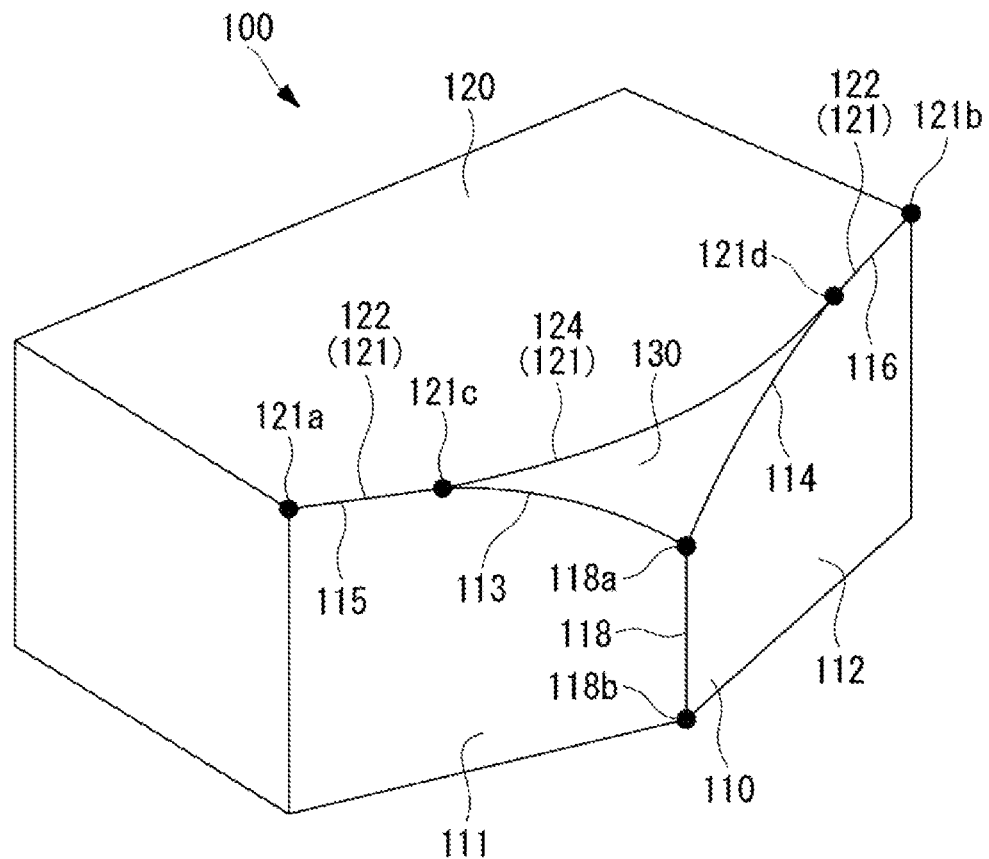
FIG. 2 is a perspective view of the molding die according to an embodiment of the disclosure.
Figure 2:
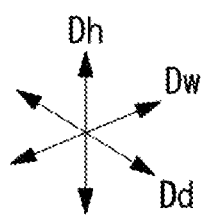

Hereinafter, an embodiment of a molding die and a shaping method according to the disclosure will be described with reference to the drawings.

In the following description, terms such as a height direction Dh (first direction), a depth direction Dd (second direction), and a width direction Dw (third direction), as well as terms such as upward and downward are used for convenience of description, and do not necessarily limit an orientation of an actual object.

Here, the height direction Dh, the depth direction Dd, and the width direction Dw are orthogonal to one another.
Molding Die A molding die 100 is for shaping a laminate 200 (charge) including a plurality of laminated fiber sheets into a kink shape.

The fiber sheet includes, for example, a fiber base material aligned such that the fiber direction becomes parallel to the longitudinal direction of the fiber sheet, and a resin impregnated into the fiber base material.

As the fiber base material, carbon fiber, glass fiber, or the like is used.

As the resin impregnated into the fiber base material, a thermosetting resin that is cured by being heated, such as an epoxy resin, polyimide, polyurethane, or unsaturated polyester, is used. Alternatively, a thermoplastic resin, such as polyamide, polyethylene, polystyrene, and polyvinyl chloride, which are solidified through heating, may be used.

As illustrated in FIGS. 1 to 4, the molding die 100 is a die including a kink surface 110, a placement surface 120, and a transitional surface 130.

The kink surface 110 is a bent surface having a first kink surface 111 (surface on the left side in FIG. 3) and a second kink surface 112 (surface on the right side in FIG. 3), and is bent such that the position in the depth direction Dd changes along the width direction Dw.

Each of the first kink surface 111 and the second kink surface 112 is a flat surface, and a kink line 118 is a boundary line between the two surfaces. Here, the kink line 118 is a line (ridge line) extending along the height direction Dh and connecting a top end point 118a (first kink point) and a bottom end point 118b (second kink point).

That is, the kink surface 110 is a bent surface to which the flat first kink surface 111 and the flat second kink surface 112 are connected with the kink line 118 extending along the height direction Dh as a boundary line, and which is bent so as to protrude in the depth direction Dd (front side in FIG. 1) with the kink line 118 extending along the height direction Dh as a ridge line.

The upper side of the first kink surface 111 has a first boundary line 113 and a first top end line 115. Similarly, the upper side of the second kink surface 112 has a second boundary line 114 and a second top end line 116.

Each of the first boundary line 113 and the second boundary line 114 is a line (ridge line) connected to the top end point 118a of the kink line 118, and is a bifurcated line that is separated from each other in the width direction Dw as it goes upward in the height direction Dh from the top end point 118a.

The first top end line 115 is a straight line (ridge line) connected to the first boundary line 113 and extends in the width direction Dw. Similarly, the second top end line 116 is a straight line (ridge line) connected to the second boundary line 114, and extends in the width direction Dw.

The placement surface 120 is a flat surface intersecting the kink surface 110, and the normal direction substantially coincides with the height direction Dh. That is, the placement surface 120 is a flat surface substantially orthogonal to the kink surface 110.

The side (side on the front side in FIG. 1) in contact with/adjacent to the kink surface 110 of the placement surface 120 is a bending line 121.

Figure 3:
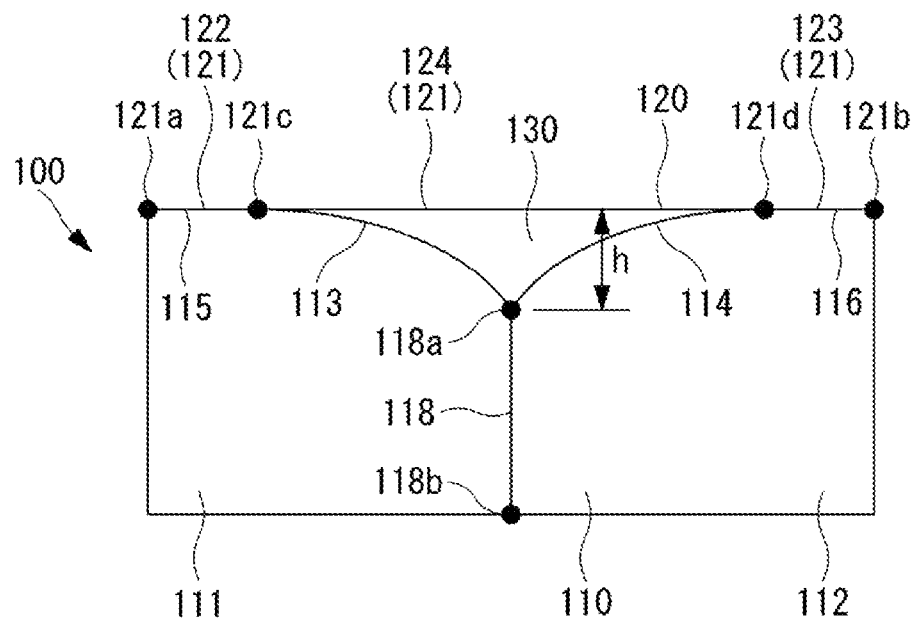
FIG. 3 is a front view of the molding die according to an embodiment of the disclosure.
Figure 4:
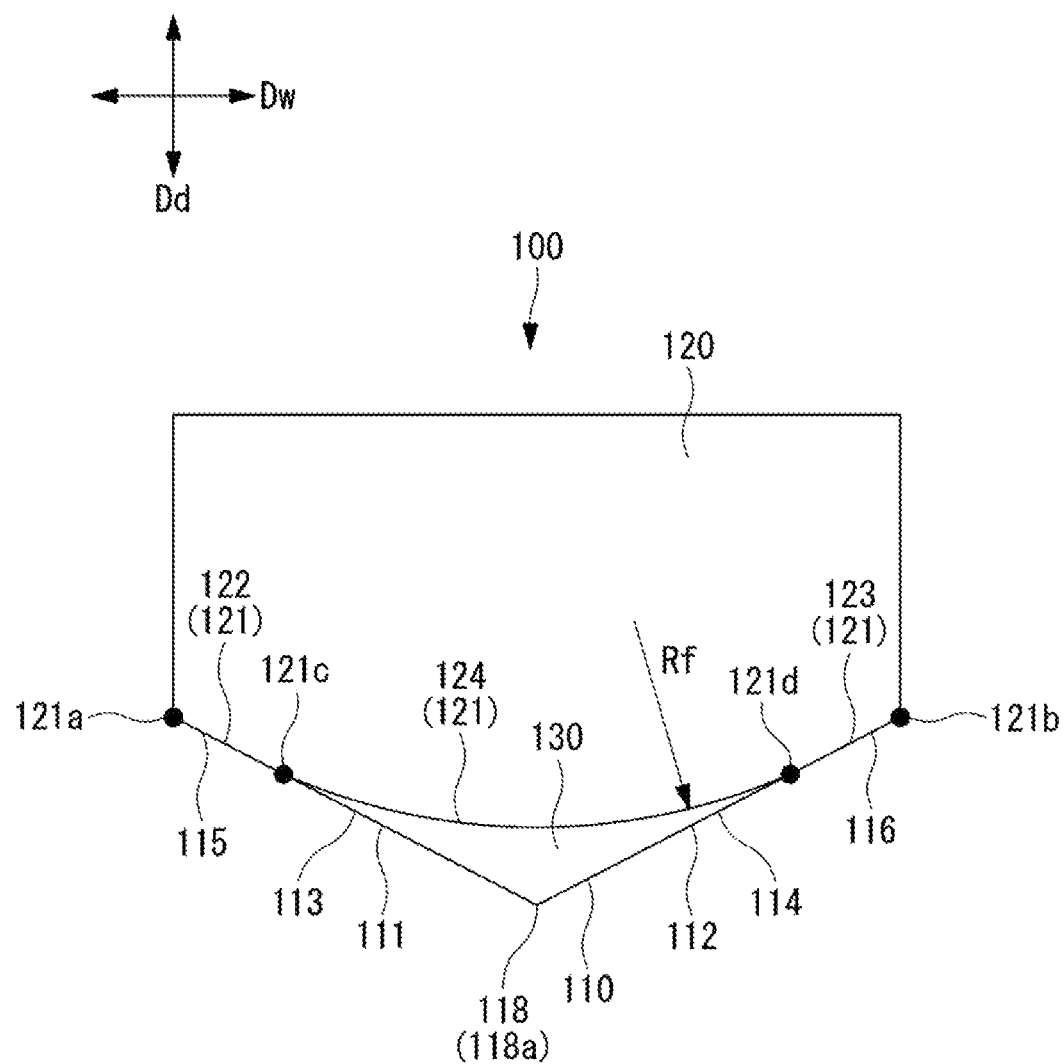
FIG. 4 is a plan view of the molding die according to an embodiment of the disclosure.

The bending line 121 is a line (ridge line) extending in the width direction Dw and connecting a first end portion 121a (end portion on the left side in FIG. 3) and a second end portion 121b (end portion on the right side in FIG. 3). The bending line 121 convexly protrudes in the depth direction Dd (front side in FIG. 1) as a whole.

The bending line 121 is positioned upper than the top end point 118a of the kink line 118 in the height direction Dh. That is, the top end point 118a is positioned between the bending line 121 and the bottom end point 118b in the height direction Dh. At this time, the dimension along the height direction Dh from the bending line 121 to the top end point 118a of the kink line 118 is defined as a height h (see FIG. 5).

Such the bending line 121 has a bending straight line 122, a bending straight line 123, and a bending convex line 124.

The bending straight line 122 is a part of the bending line 121 in a straight shape including the first end portion 121a, and coincides with the first top end line 115 of the first kink surface 111. That is, the bending straight line 122 and the first top end line 115 are the same straight line. Therefore, the bending straight line 122 is also connected to the first boundary line 113. Here, a boundary point (connection point) between the bending straight line 122 and the first boundary line 113 is defined as a first intersection 121c. The first intersection 121c is positioned closer to the first end portion 121a relative to the top end point 118a in the width direction Dw.

The bending straight line 123 is a part of the bending line 121 in a straight shape including the second end portion 121b, and coincides with the second top end line 116 of the second kink surface 112. That is, the bending straight line 123 and the second top end line 116 are the same straight line. Therefore, the bending straight line 123 is also connected to the second boundary line 114. Here, a boundary point (connection point) between the bending straight line 123 and the second boundary line 114 is defined as a second intersection 121*d*. The second intersection 121*d* is positioned closer to the second end portion 121*b* relative to the top end point 118*a* in the width direction Dw.

The bending convex line 124 is a part of the bending line 121 between the first intersection 121*c* and the second intersection 121*d*.

The bending convex line 124 is a curved line convexly protruding in the depth direction Dd (front side in FIG. 1). The curve is preferably a continuous smooth line, but may be discontinuous (for example, stepwise) in a microscopic view. This curve has a predetermined radius of curvature, for example, an arc having a radius Rf (see FIG. 5).

The transitional surface 130 is a curved surface surrounded by the bending convex line 124, the first boundary line 113, and the second boundary line 114.

That is, the transitional surface 130 is a substantially triangular curved surface connected to the placement surface 120, the first kink surface 111, and the second kink surface 112.

Figure 6:
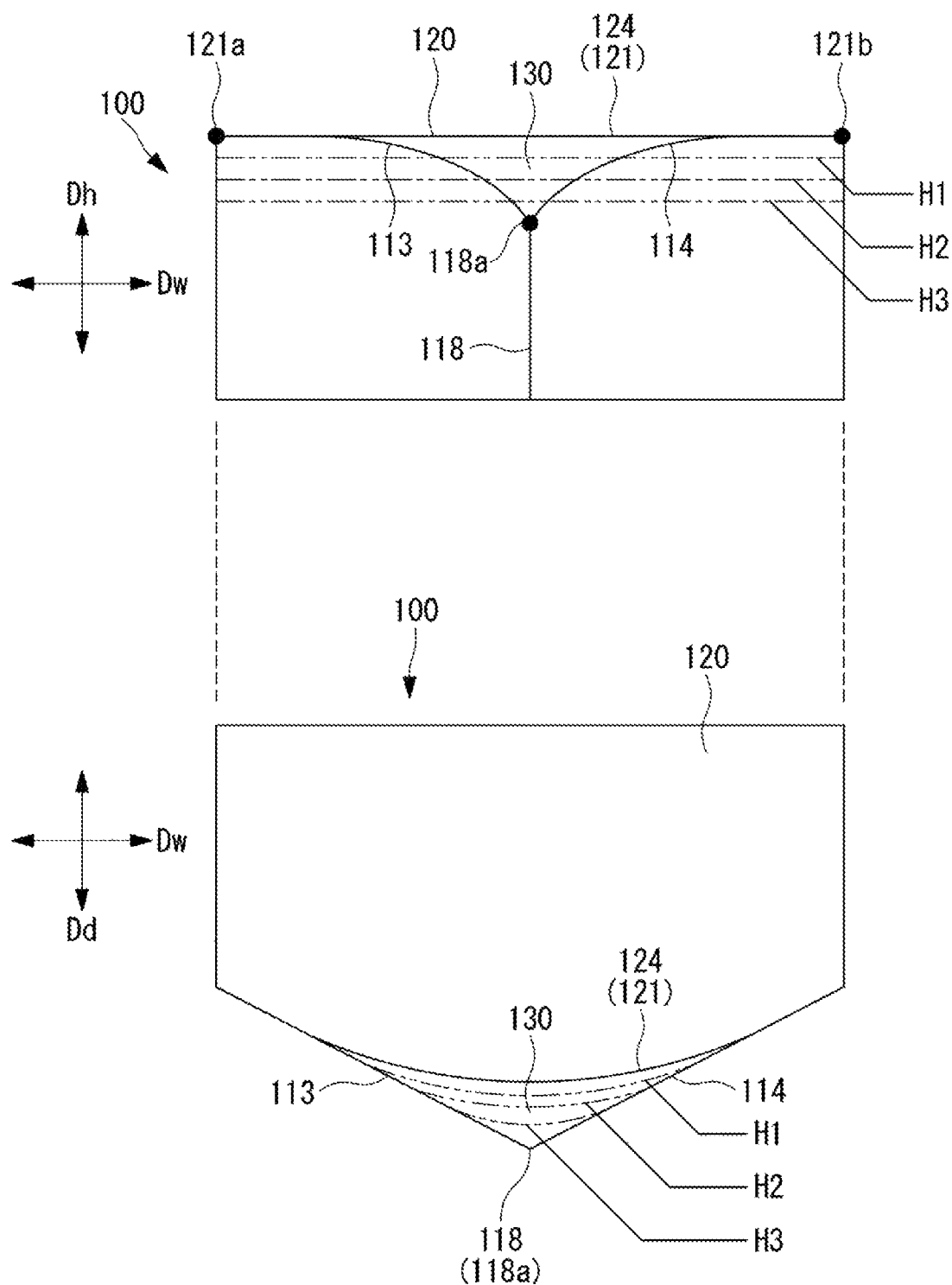
FIG. 6 is a horizontal cross-sectional view at each height position of the molding die according to an embodiment of the disclosure.

FIG. 6 illustrates horizontal cross-sectional views (cross-sectional views taken along planes extending in the depth direction Dd and the width direction Dw) of the molding die 100 in a plurality of different positions H1, H2, and H3 in the height direction Dh.

As illustrated in FIG. 6, the transitional surface 130 is a curved surface in which a curve having a shape following the shape of the bending convex line 124 gradually decreases in length (circumferential length) toward the top end point 118*a* of the kink line 118. The lowermost part of the transitional surface 130 is a point coinciding with the top end point 118*a* of the kink line 118.

The above-described circumferential length is preferably gradually changed. Therefore, the first boundary line 113 and the second boundary line 114 are preferably smooth curves. Specifically, as illustrated in FIG. 3, the first boundary line 113 is preferably a smooth curve convexly protruding toward the second end portion 121*b*, and the second boundary line 114 is preferably a smooth curve convexly protruding toward the first end portion 121*a*.

Shape Determination

Figure 5:
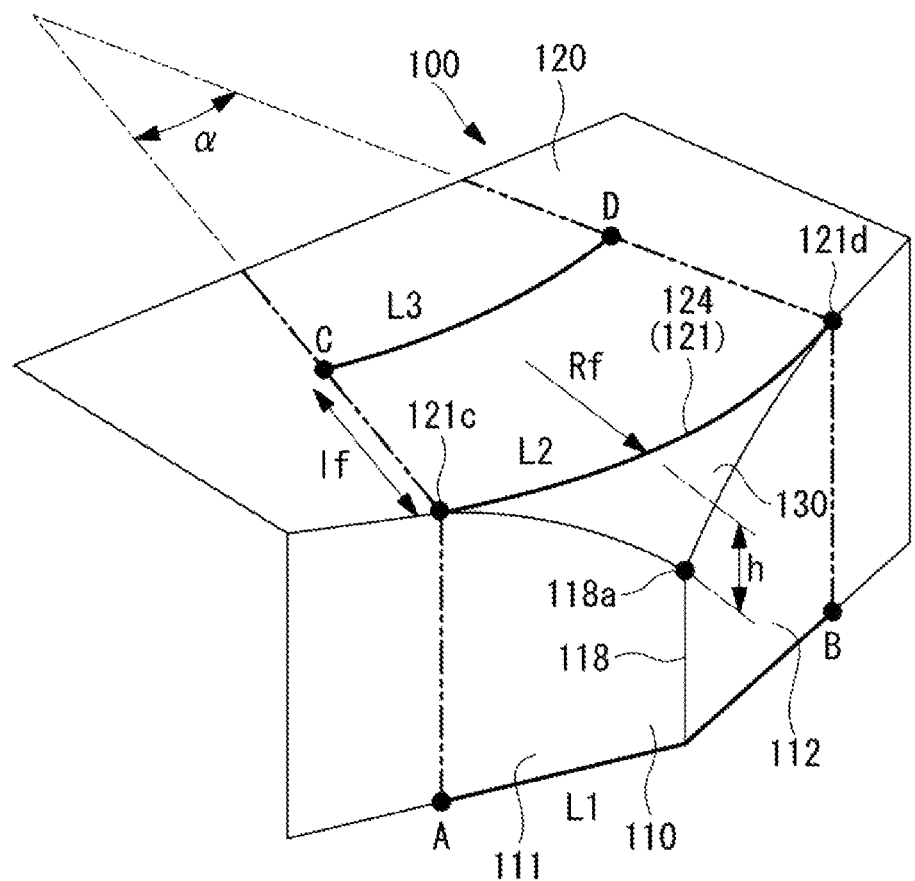
FIG. 5 is a perspective view of the molding die according to an embodiment of the disclosure.
Figure 5:
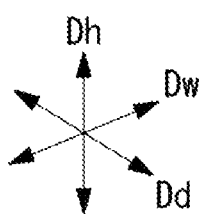

As illustrated in FIG. 5, the dimension along the height direction Dh from the bending line 121 to the top end point 118*a* of the kink line 118 is the height h. The bending convex line 124 is, for example, an arc having the radius Rf. Hereinafter, a method of determining the height h and the radius Rf will be described.

The height h and the radius Rf are determined based on the "allowable value of dθ/ds" depending on the material properties (type of fiber base material, type of resin, density between fiber base materials, and the like) of the laminate 200 and the fiber sheet.

First, dθ/ds will be described.

Figure 7:
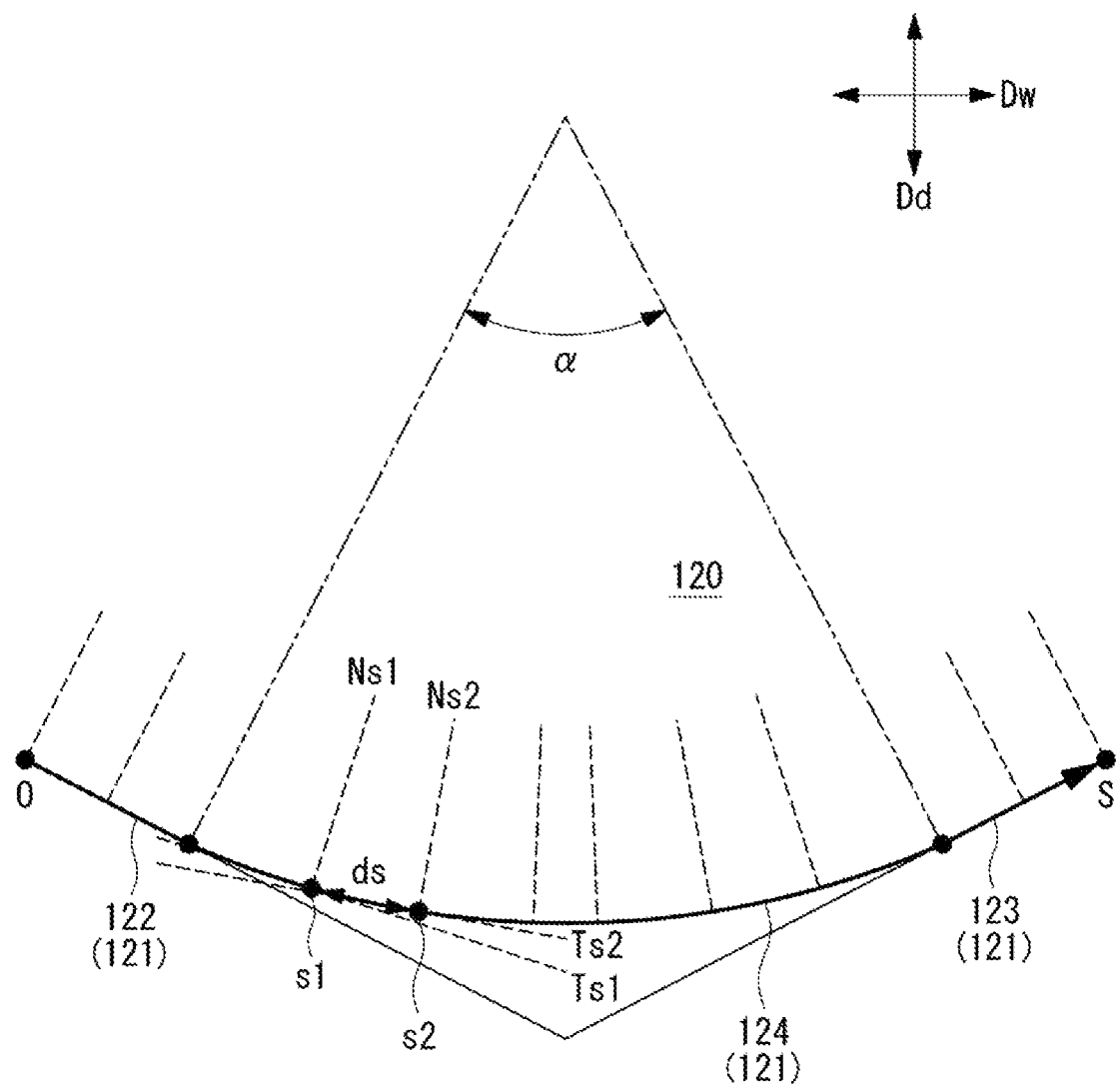
FIG. 7 is a plan view of the molding die according to an embodiment of the disclosure.

As illustrated in FIG. 7, when a curve S extending from the first end portion 121*a* as a starting point toward the second end portion 121*b* along the bending line 121 is considered, dθ/ds is a change rate of an angle of a normal line (normal line with respect to the bending line 121) when moving by a minute distance ds from a position s1 to a position s2. In other words, dθ/ds is a ratio of a change amount dθ of the angle when the angle of a normal line Ns1 at the position s1 is compared with the angle of a normal line Ns2 at the position s2 with respect to the minute distance ds.

Ts1 illustrated in FIG. 7 is a tangent line with respect to the bending line 121 at the position s1, and Ts2 is a tangent line with respect to the bending line 121 at the position s2.

Since the bending line 121 (that is, the bending straight line 122) from the first end portion 121*a* to the first intersection 121*c* and the bending line 121 (that is, the bending straight line 123) from the second intersection 121*d* to the second end portion 121*b* are straight lines, dθ/ds=0 (zero) is true. Since the bending line 121 (that is, the bending convex line 124) from the first intersection 121*c* to the second intersection 121*d* is a curved line (for example, an arc), |dθ/ds|>0 is true.

A value obtained by integrating the change amount dθ of the angle from the first intersection 121*c* to the second intersection 121*d* at the position s is an angle α.

Based on the above, the "allowable value of dθ/ds" is a limit value of the change rate of the angle at which, in consideration of the compressive stress locally acting on the fiber sheet when the change rate of the angle is dθ/ds and the relaxation of the compressive stress due to the shear deformation of the fiber sheet, the laminate 200 and the fiber sheet are not wrinkled based on appearance, even when subject to the compressive stress and shear deformation, and the fiber sheets are not shifted in the laminate 200.

For example, when the change rate of the angle is equal to or less than the allowable value of dθ/ds, even if a local compressive force acts on the laminate 200 and the fiber sheet, only the resin between the fiber base materials is compressed within a range that is not wrinkled.

The above shear deformation is applied to relax the compressive stress acting on the fiber sheet by stretching, in the width direction Dw, the compressed fiber sheet.

Radius Rf

As illustrated in FIG. 5, when a position spaced apart by a distance lf from the first intersection 121*c* along a normal line (normal line with respect to the bending line 121) at the first intersection 121*c* is defined as a point C, and a position spaced apart by the distance lf from the second intersection 121*d* along a normal line (normal line with respect to the bending line 121) at the second intersection 121*d* is defined as a point D, a length of a curve substantially parallel to the bending line 121 from the point C to the point D is defined as L3. The distance lf will be described below.

At this time, the difference between L2 and L3 is expressed by the following Equation 1.

$$L_2 - L_3 = \alpha l_f \qquad \text{Equation 1}$$

dθ/ds is expressed by the following Equation 2 based on Equation 1.

$$\frac{d\theta}{ds} = \frac{1}{R_f} \frac{L_2 - L_3}{l_f} = \frac{\alpha}{R_f} \qquad \text{Equation 2}$$

Since dθ/ds is determined by the material properties and the angle α is determined by the angle between the first kink surface 111 and the second kink surface 112, the radius Rf according to the allowable value of dθ/ds can be determined using Equation 2.

Height h

As illustrated in FIG. 5, when an intersection of a line extending downward along the height direction Dh from the first intersection 121*c* and the bottom edge of the first kink surface 111 is defined as a point A, and an intersection of a line extending downward along the height direction Dh from the second intersection 121*d* and the bottom edge of the second kink surface 112 is defined as a point B, a length of the bottom edge (bending line) of the kink surface 110 from the point A to the point B is defined as L1. The length (that is, the length of the bending convex line 124) of the bending line 121 from the first intersection 121c to the second intersection 121d is defined as L2.

At this time, the difference between L1 and L2 is expressed by the following Equation 3.

$$L_1 - L_2 = 2R_f\left(\tan\frac{\alpha}{2} - \frac{\alpha}{2}\right) \quad \text{Equation 3}$$

Here, the angle $\alpha$ is an angle between the normal line (normal line with respect to the bending line 121) at the first intersection 121c and the normal line (normal line with respect to the bending line 121) at the second intersection 121d, and depends on the angle between the first kink surface 111 and the second kink surface 112.

$d\theta/ds$ is expressed by the following Equation 4 based on Equation 3.

$$\frac{d\theta}{ds} \cong \frac{1}{R_f}\frac{L_1 - L_2}{h} = \frac{2}{h}\left(\tan\frac{\alpha}{2} - \frac{\alpha}{2}\right) \quad \text{Equation 4}$$

Since $d\theta/ds$ is determined by the material properties and the angle $\alpha$ is determined by the angle between the first kink surface 111 and the second kink surface 112, the height h according to the allowable value of $d\theta/ds$ can be determined using Equation 4.

Shaping Method

Figure 8:
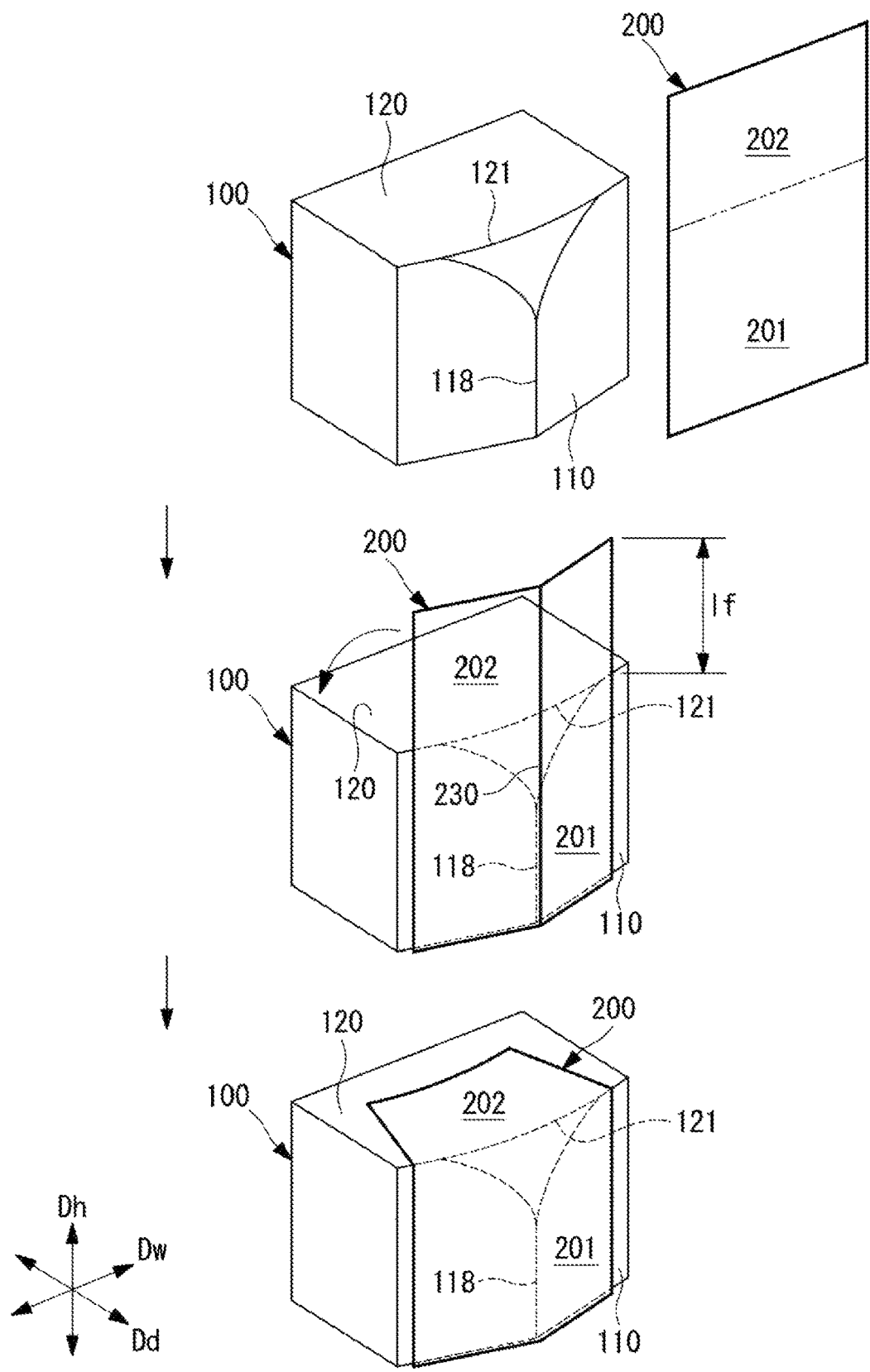
FIG. 8 is a perspective view illustrating a shaping method according to an embodiment of the disclosure.

As illustrated in FIG. 8, first, the laminate 200 is laid on the kink surface 110.

By laying the laminate 200 onto the kink surface 110, the laminate 200 is bent following the kink surface 110, and a kink line portion 230 extending along the kink line 118 provided on the kink surface 110 is formed in the laminate 200.

At this time, a part of the laminate 200 in surface contact with the kink surface 110 is defined as a first portion 201, and a part of the laminate 200 protruding upward from the kink surface 110 is defined as a second portion 202. The dimension along the height direction Dh of the second portion 202 is the distance lf.

Next, the second portion 202 of the laminate 200 is bent toward the placement surface 120 along the bending line 121 to be placed on the placement surface 120.

In the process of bending the second portion 202 toward the placement surface 120, both sides of the second portion 202 are close to the center, and the laminate 200 (fiber sheet) corresponding to the second portion 202 is compressed in the width direction Dw to generate strain.

Figure 9:
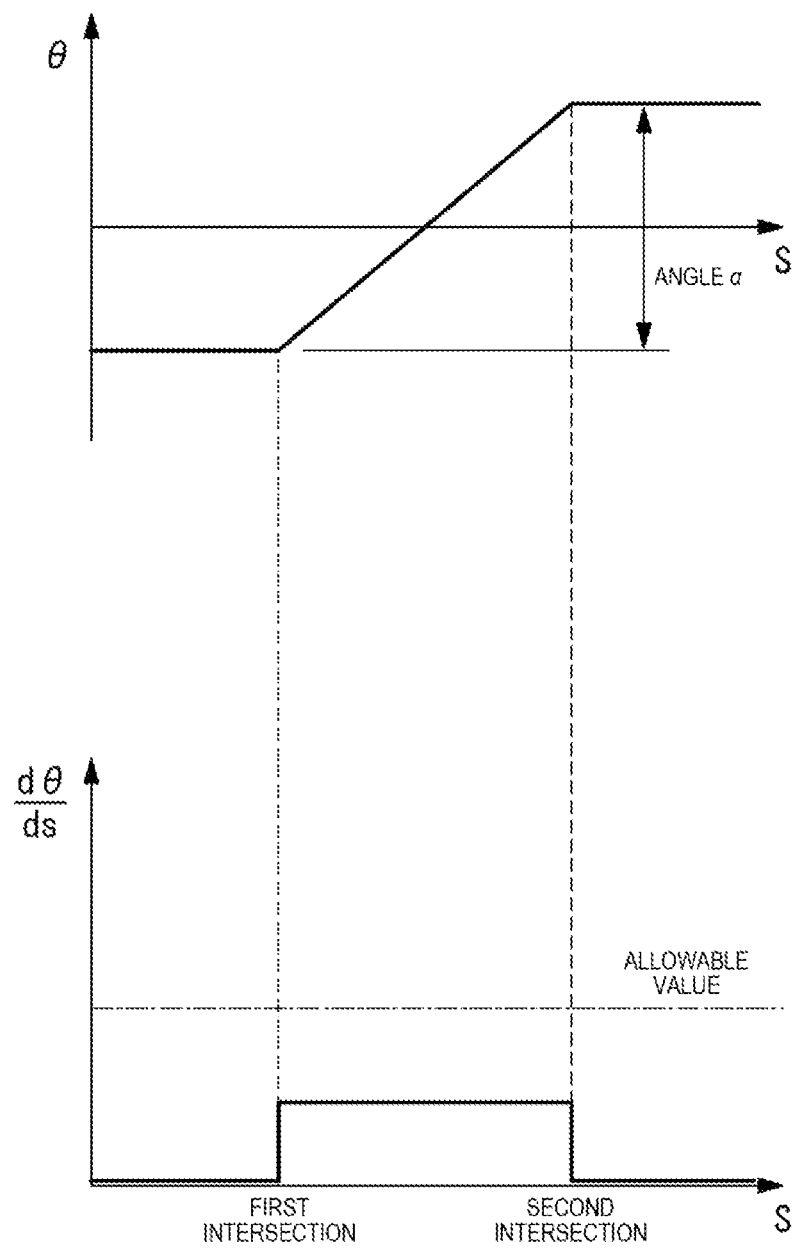
FIG. 9 is a graph illustrating a relationship between a relationship position s between a position s and an angle θ and a change rate dθ/ds of the angle.

However, as illustrated in FIG. 9, since the angle $\theta$ of the normal line continuously and gradually changes from the first intersection 121c to the second intersection 121d on the bending line 121, the change rate $d\theta/ds$ of the angle maintains a value equal to or less than the allowable value from the first intersection 121c to the second intersection 121d. That is, since there is a range between the first intersection 121c and the second intersection 121d, the change in the angle $\theta$ of the normal necessary for giving the kink shape to the laminate 200 is dispersed within the range, and the change rate $d\theta/ds$ of the angle is reduced as a whole.

Due to this, the total strain amount in the width direction Dw that should be generated in the laminate 200 (fiber sheet) corresponding to the second portion 202 is dispersed in the range between the first intersection 121c and the second intersection 121d, and therefore the total strain amount is avoided from locally concentrating, and the laminate 200 (fiber sheet) is less likely to wrinkle.

Since the graph illustrated in FIG. 9 assumes a case where the bending convex line 124 is an arc having the radius Rf, the angle change rate $d\theta/ds$ is constant in range between the first intersection 121c and the second intersection 121d.

However, as long as the change rate $d\theta/ds$ of the angle becomes equal to or less than the allowable value in the same range, the change rate $d\theta/ds$ of the angle may necessarily be not constant. That is, the radius of curvature of the bending convex line 124 may be changed in the same range.

Comparative Example

Figure 10:
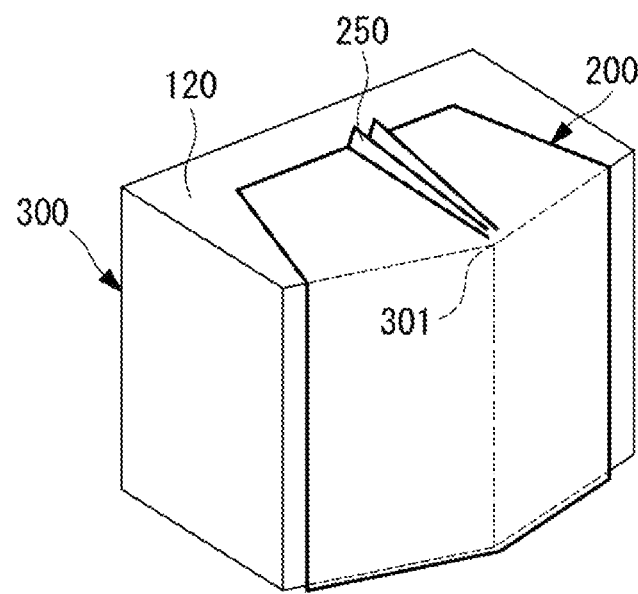
FIG. 10 is a perspective view illustrating a state after shaping according to Comparative Example 1.
Figure 10:
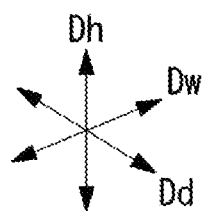

If a molding die 300 (without equivalents of the first boundary line 113, the second boundary line 114, and the bending convex line 124 of the molding die 100) as illustrated in FIG. 10 is used, the change in the angle $\theta$ of the normal line necessary for giving the kink shape to the laminate 200 is concentrated on a vertex 301.

Figure 11:
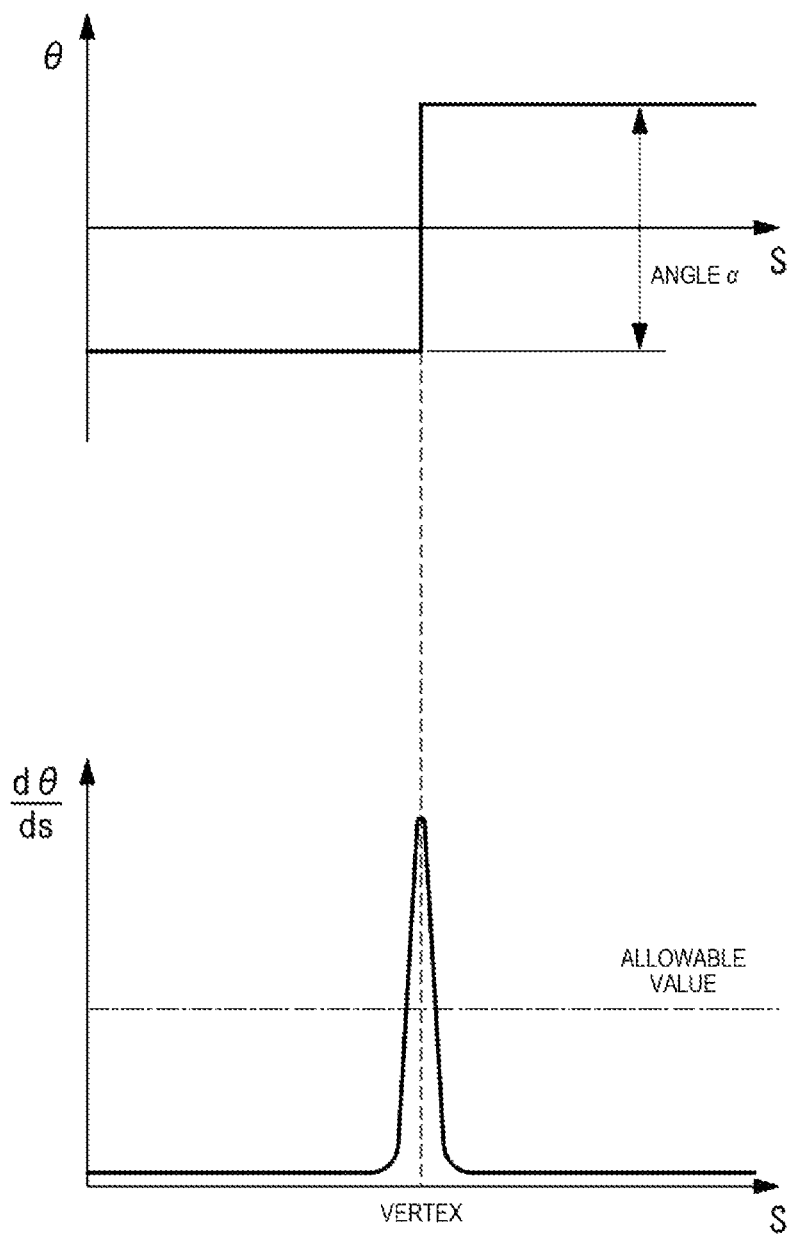
FIG. 11 is a graph showing a relationship between the relationship position s between the position s and the angle θ and the change rate dθ/ds of the angle (Comparative Example 1).

Therefore, as illustrated in FIG. 11, the change rate $d\theta/ds$ of the angle has a peak greatly exceeding the allowable value near the vertex 301. As a result, the total strain amount is locally concentrated, and wrinkles 250 are generated in the laminate 200 (fiber sheet).

Comparative Example 2

Figure 12:
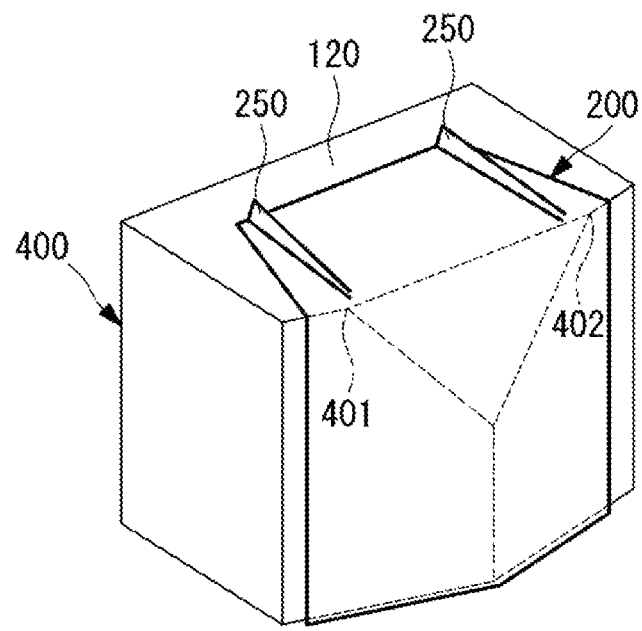
FIG. 12 is a perspective view illustrating a state after shaping according to Comparative Example 2.
Figure 12:
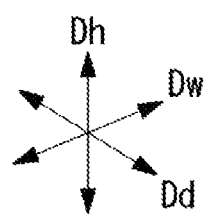

If a molding die 400 (with all equivalents of the first boundary line 113, the second boundary line 114, and the bending convex line 124 of the molding die 100 being straight lines) as illustrated in FIG. 12 is used, the change in the angle $\theta$ of the normal line necessary for giving the kink shape to the laminate 200 is concentrated on a vertex 401 and a vertex 402.

Figure 13:
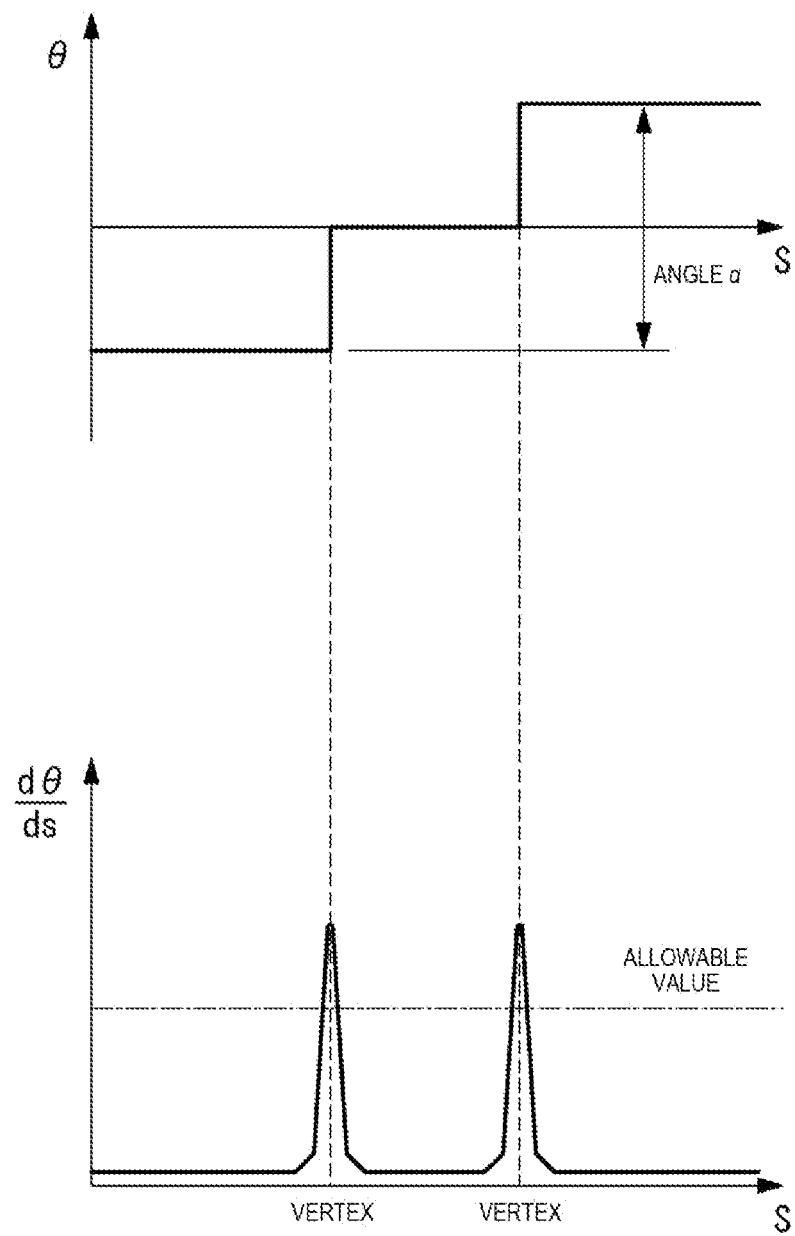
FIG. 13 is a graph showing a relationship between the relationship position s between the position s and the angle θ and the change rate dθ/ds of the angle (Comparative Example 2).

Therefore, as illustrated in FIG. 13, the change rate $d\theta/ds$ of the angle peaks near the vertex 401 and the vertex 402. Each peak has a lower numerical value than that in the case of Comparative Example 1, but exceeds the allowable value. As a result, the total strain amount is locally concentrated, and the wrinkles 250 are generated in the laminate 200 (fiber sheet).

With the present embodiment, the following effects are achieved.

Since the bending line 121 between the first intersection 121c and the second intersection 121d convexly protrudes toward the kink line 118 in the depth direction Dd, when the laminate 200 laid on the kink surface 110 is bent to be placed on the placement surface 120, the total strain amount that should be generated in the laminate 200 by the laminate 200 being compressed in the width direction Dw on the placement surface 120 is dispersed in a wide range (range wider than a case where at least the bending line is bent at one point (vertex 301) or two points (vertex 401 and vertex 402)) of the bending line 121 between the first intersection 121c and the second intersection 121d. Therefore, the total strain amount is avoided from locally concentrating, and the laminate 200 on the placement surface 120 is less likely to wrinkle.

When the bending line 121 between the first intersection 121c and the second intersection 121d is a smooth curve, the change rate $d\theta/ds$ of the angle with respect to the minute distance ds on the bending line 121 between the first intersection 121c and the second intersection 121d can be made smooth. Therefore, the change rate $d\theta/ds$ is avoided from locally increasing, and the laminate placed on the placement surface 120 less likely to wrinkle.

Since the kink surface 110 is bent with the kink line 118 as a boundary and has the first boundary line 113 and the second boundary line 114, it is possible to provide a range (bending convex line 124) convexly protruding as described above in the bending line 121 while securing, on the kink surface 110, a flat surface for forming, in the laminate 200, a flat interface with which other components are in contact.

When the first boundary line 113 is a smooth curve convexly protruding toward the second intersection 121$d$ and the second boundary line 114 is a smooth curve convexly protruding toward the first intersection 121$c$, it is possible to smooth the change rate in the distance from the first boundary line 113 to the second boundary line 114 in the height direction Dh, that is, the change rate in the circumferential length in the height direction Dh on the transitional surface 130. Therefore, the change rate is avoided from locally increasing, and the laminate 200 on the transitional surface 130 is less likely to wrinkle.

The present embodiment described above is understood as follows, for example.

That is, the molding die (100) according to a first aspect of the disclosure is a molding die for bending the laminate (200) formed by stacking a plurality of fiber sheets, the molding die (100) including: the kink surface (110) on which the laminate is laid; and the placement surface (120) intersecting the kink surface and on which the laminate is placed by bending the laminate laid on the kink surface, in which the kink surface is bent so as to protrude in the second direction (Dd) orthogonal to the first direction (Dh) with the kink line (118) extending along the first direction connecting the first kink point (118$a$) and the second kink point (118$b$) as a boundary, the placement surface has a normal direction substantially coinciding with the first direction and has the bending line (121) extending in the third direction (Dw) orthogonal to the first direction and the second direction, the kink surface has the first boundary line (113) connecting the first intersection (121$c$) on the bending line and the first kink point, and the second boundary line (114) connecting the second intersection (121$d$) on the bending line and the first kink point, the first intersection is positioned closer to one end (121$a$) of the bending line relative to the first kink point in the third direction, the second intersection is positioned closer to the other end (121$b$) of the bending line relative to the first kink point in the third direction, the first kink point is positioned between the first intersection and the second intersection and the second kink point in the first direction, and the bending line between the first intersection and the second intersection convexly protrudes toward the kink line in the second direction.

According to a molding die according to the present aspect, since the bending line between the first intersection and the second intersection convexly protrudes toward the kink line in the second direction, when the laminate laid on the kink surface is bent to be placed on the placement surface, the total strain amount that should be generated in the laminate by the laminate being compressed in the third direction on the placement surface is dispersed in a wide range (range wider than a case where at least the bending line is bent at one point or two points) of the bending line between the first intersection and the second intersection. Therefore, the total strain amount is avoided from locally concentrating, and the laminate placed on the placement surface is less likely to wrinkle.

Since the kink surface is bent with the kink line as a boundary and has the first boundary line and the second boundary line, it is possible to provide a range convexly protruding as described above in the bending line while securing, on the kink surface, a flat surface for forming, in the laminate, a flat interface with which other components are in contact.

In a molding die according to a second aspect of the disclosure, in the first aspect, the bending line between the first intersection and the second intersection is a smooth curve convexly protruding toward the kink line.

According to the molding die according to the present aspect, since the bending line between the first intersection and the second intersection is a smooth curve convexly protruding toward the kink line, the change rate of the angle with respect to the minute distance on the bending line between the first intersection and the second intersection can be made smooth. Therefore, the change rate is avoided from locally increasing, and the laminate placed on the placement surface is less likely to wrinkle.

In a molding die according to a third aspect of the disclosure, in the second aspect, the bending line between the first intersection and the second intersection is an arc.

According to the molding die according to the present aspect, since the bending line between the first intersection and the second intersection is an arc, the change rate of the angle with respect to a minute distance on the bending line between the first intersection and the second intersection can be made constant. Therefore, the change rate is avoided from locally increasing, and the laminate placed on the placement surface is less likely to wrinkle.

In a molding die according to a fourth aspect of the disclosure, in any of the first to third aspects, the first boundary line is a smooth curve convexly protruding toward the second intersection, and the second boundary line is a smooth curve convexly protruding toward the first intersection.

According to the molding die according to the present aspect, since the first boundary line is a smooth curve convexly protruding toward the second intersection, and the second boundary line is a smooth curve convexly protruding toward the first intersection, it is possible to smooth the change rate in the distance from the first boundary line to the second boundary line in the first direction, that is, the change rate in the circumferential length in the first direction on the surface (hereinafter, called the "transitional surface") surrounded by the three lines of the bending line, the first boundary line, and the second boundary line. Therefore, the change rate is avoided from locally increasing, and the laminate placed on the transitional surface is less likely to wrinkle.

A shaping method according to a fifth aspect of the disclosure is a shaping method for shaping the laminate using the molding die described in any of the first to fourth aspects, the shaping method including: laying the laminate on the kink surface; and bending, toward the placement surface along the bending line, the laminate laid on the kink surface.

While preferred embodiments of the invention have been described as above, it is to be understood that variations and modifications will be apparent to those skilled in the art without departing from the scope and spirit of the invention. The scope of the invention, therefore, is to be determined solely by the following claims.

The invention claimed is:

1. A molding die for bending a laminate formed by stacking a plurality of fiber sheets, the molding die comprising:
    a kink surface on which the laminate is laid; and a placement surface intersecting the kink surface and on which the laminate is placed by bending the laminate laid on the kink surface, wherein the kink surface is bent so as to protrude in a second direction orthogonal to a first direction, with a kink line extending along the first direction connecting a first kink point and a second kink point as a boundary, the placement surface has a normal direction substantially coinciding with the first direction and has a bending line extending in a third direction orthogonal to the first direction and the second direction, the kink surface has a first boundary line connecting a first intersection on the bending line and the first kink point, and a second boundary line connecting a second intersection on the bending line and the first kink point, the first intersection is positioned closer to one end of the bending line relative to the first kink point in the third direction, the second intersection is positioned closer to an other end of the bending line relative to the first kink point in the third direction, the first kink point is positioned between the first intersection and the second intersection and the second kink point in the first direction, and the bending line between the first intersection and the second intersection convexly protrudes toward the kink line in the second direction.

2. The molding die according to claim 1, wherein the bending line between the first intersection and the second intersection is a smooth curve convexly protruding toward the kink line.

3. The molding die according to claim 2, wherein the bending line between the first intersection and the second intersection is an arc.

4. The molding die according to claim 1, wherein
the first boundary line is a smooth curve convexly protruding toward the second intersection, and
the second boundary line is a smooth curve convexly protruding toward the first intersection.

5. A shaping method for shaping the laminate using the molding die described in claim 1, the shaping method comprising:
laying the laminate on the kink surface; and
bending, toward the placement surface along the bending line, the laminate laid on the kink surface.

* * * * *